(No Model.)

T. MILLER.
COMBINED LIQUOR MIXER AND STRAINER.

No. 265,126. Patented Sept. 26, 1882.

Witnesses.
H. O. Williams
C. G. Baker

Thomas Miller.
Inventor.
per Alfred Theolock
Atty.

UNITED STATES PATENT OFFICE.

THOMAS MILLER, OF JERSEY CITY, NEW JERSEY.

COMBINED LIQUOR MIXER AND STRAINER.

SPECIFICATION forming part of Letters Patent No. 265,126, dated September 26, 1882.

Application filed August 22, 1882. (No model.)

*To all whom it may concern:*

Be it known that I, THOMAS MILLER, a subject of the Queen of Great Britain, residing at Jersey City, county of Hudson, State of New Jersey, have invented a certain Improved Combined Liquor Mixer and Strainer, of which the following is a specification.

Liquor-mixers are generally made of metal of a conical form, adapted, when placed over a glass or tumbler in an inverted position, to form a water-tight joint with the edge of the glass or tumbler, so as to enable the contents of the same to be well shaken together without loss; and after so shaking up, and thereby thoroughly mixing the contents, when of two or more materials, the mixture is strained by pouring it from the mixer through a strainer into the glass or tumbler.

This invention has for its object to provide the mixer with a straining device permanently attached thereto in such a manner as in no wise to interfere with the operation of it when used as a shaker, and yet capable of being moved over the mouth so as to act as a strainer to the contents when the same are poured out, thus providing the user of such devices with one by means of which the shaking, mixing, and straining of mixed drinks may be more readily effected.

The invention consists of hinging to the opposite sides of an ordinary liquor-mixer, near its upper end, a hood provided with openings or perforations at one of its sides, so shaped as to lie close to the outside of the mixer when moved over in one position, and to partly inclose the mouth fitting into the inside edge of it when moved over on the pivots which form the hinges into the other position, the openings or perforations, which are then adjacent to the edge of the mixer, performing the functions of a strainer to the contents as they are discharged therefrom, as will be readily understood by reference had to the accompanying drawings, in which—

Figure 2:
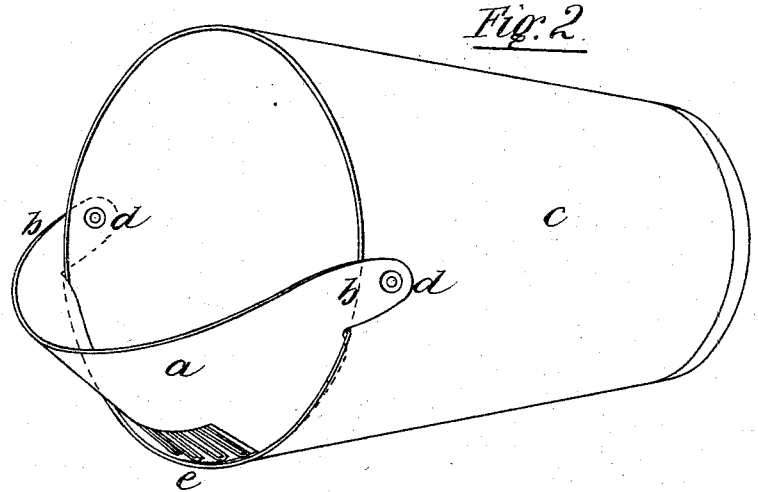
Figure 1:
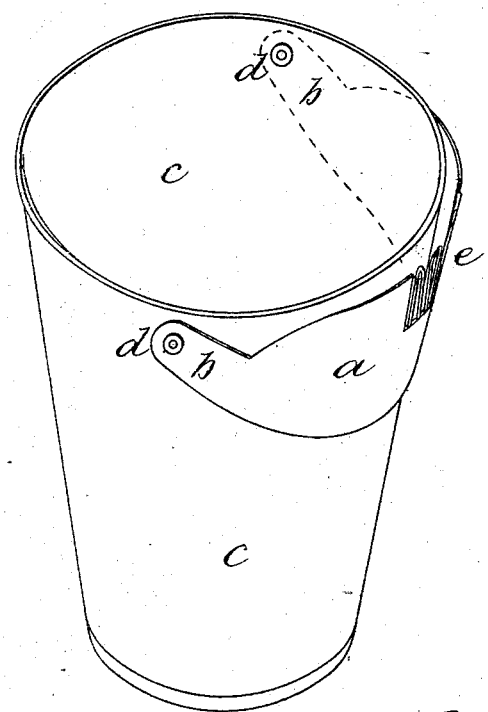

Figure 1 is a perspective view of a liquor-mixer provided with my improved strainer moved away from the mouth so as to lie against the side, and Fig. 2 represents the strainer moved into position to strain the contents as they are being discharged from the mixer.

The strainer $a$ consists of a piece of sheet metal or other suitable material in the form of a hood, having two ears, $b\,b$, through which and the sides of the mixer $c$ are passed and secured the rivets $d\,d$, which form the pivots on which the strainer $a$ turns. In the side of the strainer $a$ adjacent to the edge of the mixer $c$, when it is in position to strain, as shown at Fig. 2, are formed the openings or perforations, which may consist of one large opening, having a corrugated wire $e$ soldered in it, as shown, or consist of several smaller openings made through it, or one long narrow opening in its edge to form a slit in conjunction with the edge of the mixer.

It is obvious that my improved movable strainer may be somewhat modified in construction without departing from my invention, the feature of which consists in the application of a strainer to liquor-mixers, adapted to be moved out of the way, so as in no wise to interfere with the operation of the device when used as a shaker, as shown at Fig. 1, and capable of being placed into position to act as a strainer, as shown at Fig. 2.

Having thus described my invention, what I claim, and desire to secure by Letters Patent, is—

1. A liquor-mixer provided with a movable hood adapted to partly cover its mouth to act as a strainer thereto, and be movable over against its side clear of the mouth, substantially as and for the purpose set forth.

2. In combination, the mixer $c$ and hood $a$, pivoted thereto, and provided with a straining device, $e$, substantially as set forth.

In testimony whereof I have hereunto set my hand, at New York, county and State of New York, this 21st day of August, A. D. 1882.

THOMAS MILLER.

In presence of—
H. D. WILLIAMS,
E. G. BAKER.